United States Patent [19]

Bennett et al.

[11] Patent Number: 5,071,568

[45] Date of Patent: Dec. 10, 1991

[54] SELENIUM REMOVAL PROCESS

[75] Inventors: Charles R. Bennett; John Gerlach, both of Fullerton, Calif.

[73] Assignee: Union Oil Company of California, Los Angeles, Calif.

[21] Appl. No.: 606,519

[22] Filed: Oct. 31, 1990

[51] Int. Cl.$^5$ ............................................. C02F 1/76
[52] U.S. Cl. .................... 210/754; 210/721; 210/724; 210/753; 210/756; 210/912; 210/919; 423/508
[58] Field of Search ............... 210/702, 721, 724, 726, 210/754, 756, 902, 911, 912, 753, 919; 423/508, 509

[56] References Cited

U.S. PATENT DOCUMENTS

| | | | |
|---|---|---|---|
| 4,405,464 | 9/1983 | Baldwin et al. | 210/717 |
| 4,678,584 | 7/1987 | Elfline | 423/509 |
| 4,806,264 | 2/1989 | Murphy | 210/902 |
| 4,915,928 | 4/1990 | Marcantonio | 210/670 |
| 4,940,549 | 7/1990 | Olsen et al. | 210/721 |

FOREIGN PATENT DOCUMENTS

WO84/03692 9/1984 PCT Int'l Appl. .
289750 8/1978 U.S.S.R. ............................ 423/508

OTHER PUBLICATIONS

Proceeding of the 35th Industrial Waste Conference, Purdue University, (1981) "Removal of Toxic Metals from Power Generation Waste Streams by Adsorption and Coprecipitation," Benjamin et al., pp. 281-292.

Merrill et al., Journal Water Pollution Control Federation, 58 (1): pp. 18-26, (Jan. 1986).
Quality Criteria for Water 1986, EPA 440/5-86-001 N.T.I.S.; Publication PB87-226759, pp. 9-10, 250-251.

Primary Examiner—Peter Hruskoci
Attorney, Agent, or Firm—Gregory F. Wirzbicki; Shlomo R. Frieman

[57] ABSTRACT

The ability of a waste treatment process to remove selenium from a waste stream is improved by pretreating the waste with a compound selected from the group having the formula $X(ZO_a)_b$, $Q_mO_n$, $ClO_3$, $Cl_2O_6$, $Br_3O_8$, Ti $I_2O_5$, and mixtures thereof, wherein X is a cation, Z is halogen selected from the group consisting of chlorine, bromine, and iodine, a is an integer from 1-3, b is an integer equal to the valence of X, Q is chlorine or bromine, and m and n are each 1 or 2, provided than m+n equals 3.

20 Claims, 1 Drawing Sheet

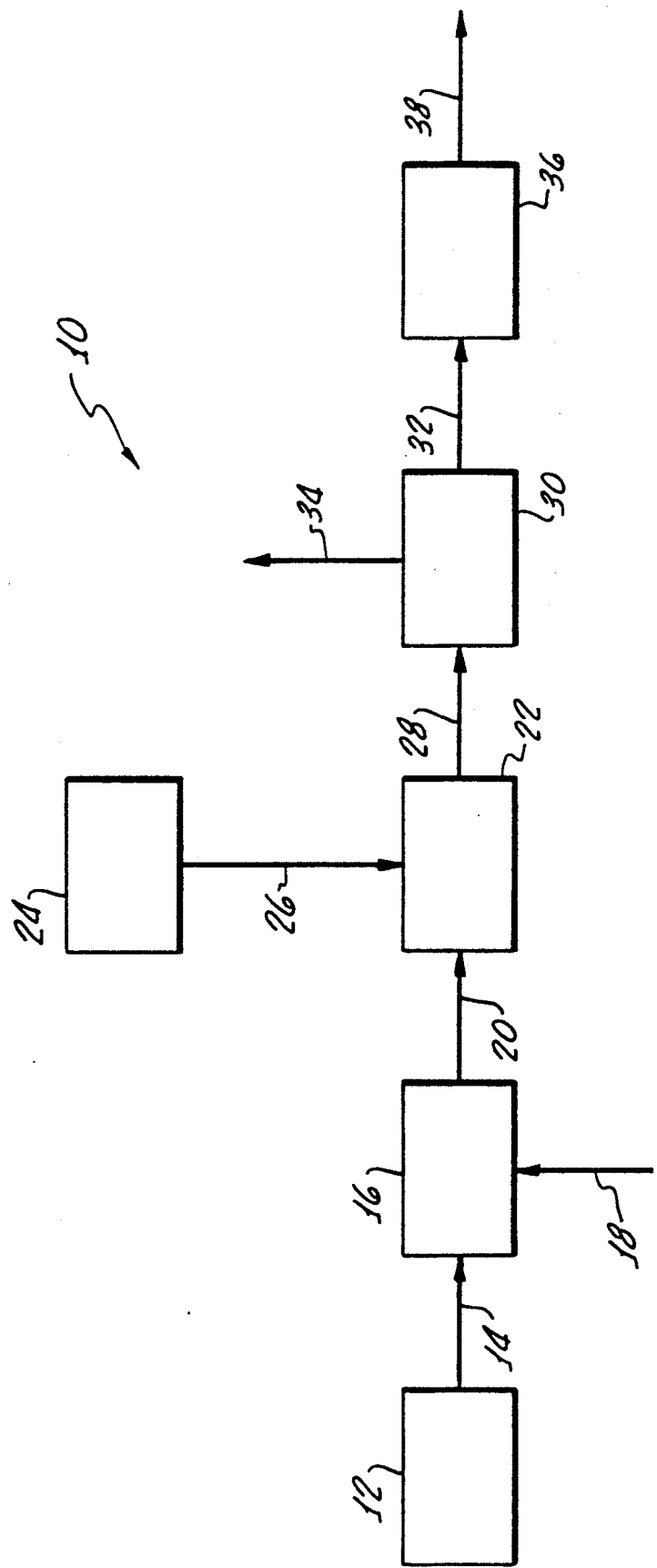

SELENIUM REMOVAL PROCESS

BACKGROUND

The present invention relates to a process for removing selenium from a fluid and, in particular, to a process for removing selenium from a waste water stream.

There is increasing concern over the hazards posed by the rising levels of pollutants within the world's water supplies. Pollutants include, but are not limited to, acenapthene, acrolein, acrylonitrile, aldrin, antimony, arsenic, asbestos, benzene, benzidine, beryllium, cadmium, carbon tetrachloride, chloralkyl ethers, chlordane, chlorinated benzenes, chlorinated ethanes, chlorinated, naphthalenes, chlorinated phenols, chloroform, chlorophenol, chromium, copper, cyanide, dichlorobenzenes, dichlorobenzidines, dichloroethylene, dichloropropane, dichloropropene, dieldrin, dimethyl phenol, dinitrotoluene, dioxin, endosulfan, ethylbenzene, fluoranthene, haloethers, halomethanes, heptachlor, hexachlorobenzene, hexachlorobutadiene, hexachlorocyclohexane, hexachlorocyclopentadiene, hexachlorinated ethanes, isophorone, lead, mercury, naphthalene, nickel, nitrobenzene, nitrophenols, nitrosamines, pentachlorinated ethanes, pentachlorophenol, phenol, phthalate esters, polynuclear aromatic hydrocarbons, selenium, silver, tetrachlorinated ethanes, tetrachlorinated benzene, tetrachloroethylene, tetrachlorophenol, thallium, toluene, toxaphene, trichlorinated ethanes, trichlorobenzene, trichloroethylene, trichlorophenol, vinyl chloride, and zinc. A more extensive list of pollutants is set forth on pages 9–10 of Quality Criteria for Water 1986, EPA Publication 440/5-86-001, also available from the U.S. Department of Commerce, National Technical Information Service as publication PB87-226759, the publication being incorporated in its entirety by this reference.

Another criteria used in describing waste water streams is the chemical oxygen demand (COD) of the stream. (Tests for determining the COD of an aqueous medium are well know to those skilled in the art and include the Open Reflux Method, the Closed Reflux Titrimetric Method, and the Closed Reflux Colorimetric Method.) Although waste water streams can have a COD as low as about 25 mg oxygen/l, waste water streams generally have a COD of at least about 50 mg oxygen/l, and more typically at least about 100 mg oxygen/l. However, it is not uncommon for waste water streams to have a COD greater than about 500 mg oxygen/l or even greater than 1,000 mg oxygen/l. In fact, quite often, waste water streams have a COD greater than about 2,500 mg oxygen/l and, indeed, greater than about 5,000 mg oxygen/l.

Regarding selenium, the toxicity of selenium is evidenced by the following excerpt from The Merck Index, 10th Edition, Windholz et al. Editors, Merck & Co., Inc., Rahway, NJ (1983): "Occupational exposure has caused pallor, nervousness, depression, garlic odor of breath and sweat, G.I. disturbances, dermatitis. Liver injury has been produced in [experimental] animals."

Techniques for removing selenium from waste water streams are known. See, for example, PCT International Application WO 84/03692, the publication being incorporated herein in its entirety by this reference. Nevertheless, there is a need to increase the efficiency of these selenium removal processes and to provide techniques for removing selenium from waste waters substantially unaffected by present selenium removal procedures.

SUMMARY OF THE INVENTION

The present invention provides a pretreatment process for increasing the efficiency of selenium removal procedures. More particularly, in accordance with this invention, prior to subjecting a selenium-containing waste water stream to a selenium removal procedure, the waste water stream is contacted with a compound (hereinafter "the oxidizing agent") selected from the group having the formula $X(ZO_a)_b$, $Q_mO_n$, $ClO_3$, $Cl_2O_6$, $Br_3O_8$, $I_2O_5$, and mixtures thereof to form a pretreatment stream comprising, among other constituents, selenium and the above compound wherein X is a cation, Z is a halogen selected from the group consisting of chlorine, bromine, and iodine, a is an integer from 1–3, b is an integer equal to the valence of X, Q is chlorine or bromine, and m and n are each than $m+n$ equals 3. A sufficient amount of the oxidizing agent is used in the pretreatment process of the present invention so that at least a portion of the selenium present in the waste water stream in a valence state less than +4 is raised to the +4 valence state. By increasing the concentration of $Se^{+4}$ with respect to the total selenium concentration, the subsequent selenium removal procedure removes more selenium and thereby provides an effluent having a lower selenium concentration.

DRAWING

Techniques for conducting selenium removal procedures in conjunction with the pretreatment process of the present invention as well as other features, aspects, and advantages will become better understood with reference to the following description, appended claims, and accompanying drawing. The sole figure in the drawing is a schematic flow diagram depicting an exemplary system for practicing a pretreatment process-selenium removal procedure embodying features of the present invention.

DETAILED DESCRIPTION OF THE INVENTION

Selenium has four oxidation states $Se^{-2}$, $Se^0$, $Se^{+2}$, $Se^{+4}$, and $Se^{+6}$. The present invention is based on the observation that many waste treatment removal processes can primarily remove only $Se^{+4}$ from a waste water stream. Accordingly, the present invention entails pretreating the waste water stream with specific oxidizing agents that raise $Se^{-2}$, $Se^0$, and $Se^{+2}$ to $Se^{+4}$, and then subjecting the pretreated waste water stream to a waste removal process. The invention requires the use of these specific oxidizing agents because, as will be demonstrated below in a comparative example, pretreating the waste water with a different oxidizing compound having a similar redox potential is substantially incapable of improving the selenium removal efficiency of a waste water treatment process.

The oxidizing agents used in the pretreatment process of the present invention are selected from the group having the formula $X(ZO_a)_b$, $Q_mO_n$, $ClO_3$, $Cl_2O_6$, $Br_3O_8$, $I_2O_5$, and mixtures thereof, wherein X is a cation, Z is a halogen selected from the group consisting of chlorine, bromine, and iodine, a is an integer from 1-3, b is an integer equal to the valence of X, Q is chlorine or bromine, and m and n are each 1 or 2 provided than m+n equals 3. Preferably, X is selected from the group consisting of alkali metals and alkaline-earth metals and, more preferably, is selected from the group consisting of sodium, potassium, calcium, and magnesium. Most preferably, X is sodium or potassium, with sodium being the cation of choice due to its low cost and commercial availability. While chlorine and bromine are the preferred halogens for Z, Z is most preferably chlorine because of cost and commercial availability considerations. Accordingly, the preferred oxidizing agents within the formula $X(ZO_a)_b$, and the preferred oxidizing agents employed in the pretreatment process of the present invention, have the formula $Na_aClO_b$. Specific preferred compounds include chlorine dioxide ($ClO_2$), sodium hypochlorite (NaClO), sodium chlorite ($NaClO_2$), and sodium chlorate ($NaClO_3$), with the most preferred oxidizing agent being sodium hypochlorite.

Regarding oxidizing agents within the formula $Q_mO_n$, preferably Q is chlorine, m is 1 and n is 2, i.e., the preferred oxidizing agent within the scope of this latter formula is $ClO_2$.

The redox potentials of exemplary oxidizing agents employed in the present invention in neutral to basic solutions is shown in the following Table I:

TABLE I

| Reaction | Redox Potential |
|---|---|
| $ClO^- + H_2O + 2e \to Cl^- + 2OH^-$ | 0.90 |
| $ClO_2 (aq) + e \to ClO_2^-$ | 0.95 |
| $ClO_3^- + H_2O + 2e \to ClO_2^- + OH^-$ | 0.35 |
| $ClO_3^- + 3H_2O + 6e \to Cl^- + 6OH^-$ | 0.62 |
| $ClO_2^- + 2H_2O + 4e \to Cl^- + 4OH^-$ | 0.76 |

In accordance with the waste water pretreatment process of the present invention, a sufficient amount of one or more of the above described oxidizing agents is introduced, and preferably with thorough mixing, into a waste water stream to raise a desired percentage of the $Se^{-2}$, $Se^0$, and $Se^{+2}$ content of the waste water stream to $Se^{+4}$. The amount of the oxidizing agent required to achieve this desired percentage is generally empirically determined because selenium is not the only oxidizable constituent present in the waste water stream. More particularly, each waste stream has a potentially different combination of non-selenium containing oxidizable ingredients that enter into competing reactions with the oxidizing agent.

The empirical tests are straightforward. In one exemplary empirical test, a different amount of the oxidizing agent is added, with stirring or other form of mixing, to separate aliquots of the waste water to be treated. The increase in the $Se^{+4}$ concentration in each aliquot is then determined in accordance with standard analytical procedures, e.g., hydride generation and atomic absorption spectroscopy. The amount of the oxidizing agent required for use in the pretreatment process is that necessary to achieve an oxidizing agent concentration in the waste water approximately equal to the concentration of the oxidizing agent present in the pretreated waste water aliquot demonstrating the desired increase in $Se^{+4}$ concentration. Generally, it is desired to employ a sufficient amount of the oxidizing agent to increase the $Se^{+4}$ concentration of the waste water by at least about 50 percent, preferably by at least about 75 percent, more preferably by at least about 85 percent, and most preferably by at least about 90 percent.

In another exemplary empirical test, instead of testing the pretreated aliquot for its $Se^{+4}$ content, the pretreated aliquot is subjected to a pilot plant or other simulated version of the proposed waste treatment process and the selenium concentration in the waste water treatment effluent is determined. The amount of the oxidizing agent required for use in the pretreatment process is that necessary to achieve an oxidizing agent concentration in the waste water approximately equal to the concentration of the oxidizing agent present in the pretreated waste water aliquot whose effluent from the waste water treatment process yields the desired decrease in selenium content. Usually, a sufficient amount of the oxidizing agent is used in the pretreatment process of the present invention to achieve at least about a 50 percent decrease in the selenium concentration of the waste water, preferably a decrease of at least about 75 percent, more preferably a decrease of at least about 85 percent, and most preferably a decrease at least about 90 percent.

Although the pH of the waste water does not appear to affect the efficacy of the pretreatment process of the present invention, it can affect the efficacy of some waste water treatment processes used to remove selenium. Accordingly, it is preferred that the pH of the waste water be at least about 6, more preferably at least about 7, and most preferably about 7.5 to about 8.5.

The pretreatment process of the present invention can be used in combination with numerous waste water treatment processes. A schematic flow diagram showing an exemplary interrelationship of the selenium pretreatment process with some of these waste water treatment processes is illustrated in the sole figure, which depicts an industrial site 10. On the industrial site 10 is an industrial process 12 generating a selenium-containing waste water stream. The selenium-containing waste water stream is conducted by a conduit 14 to a preliminary air oxidation vessel 16. Air is sparged or otherwise introduced through a conduit 18 into the air oxidation vessel 16 to permit oxygen in the air to oxidize any readily oxidizable compounds also present in the waste water stream. This preliminary oxidation step is desirable because it decreases the amount of the oxidizing agent required to oxidize $Se^{-2}$, $Se^0$, $Se^{+2}$ to $Se^{+4}$. This phenomenon is demonstrated below in Example 8 when contrasted with the results obtained in Example 10.

The effluent from the oxidation vessel 16 proceeds through a conduit 20 and enters a pretreatment vessel 22. The pretreatment vessel 22, for example, is a batch mixing tank or simply a portion of the conduit 20 where the oxidizing agent employed in the present invention is injected or otherwise introduced into the moving selenium-containing waste water. The oxidizing agent used in the present invention is stored in a vessel 24 and is transported from the storage vessel 24 to the pretreatment vessel 22 through a conduit 26. The pretreated waste water leaves the pretreatment vessel 22 through a conduit 28 and enters a waste treatment plant 30.

Waste water treatment processes that remove selenium are well known to those skilled in the art. One such process is the UNIPURE process available from the UNOCAL Chemicals Division of the UNOCAL Corporation. After being treated in the waste treatment plant 30 by the UNIPURE process or other selenium removing waste water treatment process, the effluent having a reduced selenium content leaves the waste treatment plant via a conduit 32 and the removed selenium, usually in combination with other removed, undesirable materials, leaves the waste treatment plant 30 by a different conduit 34. The effluent having a reduced selenium content is conducted by the conduit 32 to a biotreatment plant 36.

As with water treatment processes, biotreatment process are also well known to those skilled in the art and need not be elaborated upon. Suffice to say that the biotreatment plant effluent is carried by a conduit 38 and is either recycled within the industrial site 10 for further use or discharged in accordance with environmentally sound practices.

EXAMPLES

Comparative examples are provided below demonstrating the efficacy of the pretreatment process of the present invention. A baseline is established in Example 1 demonstrating that a waste water treatment process can be virtually incapable of removing selenium. Example 2 demonstrates that the ability of the waste water treatment process to remove selenium remains substantially unchanged when an oxidizing compound not within the class of the oxidizing agents used in the present invention—but having a very similar redox potential—is used to pretreat the waste water. Examples 3-7 show that, by pretreating the waste water in accordance with several exemplary versions of the present invention, the ability of the waste water treatment process to remove selenium is remarkably improved.

Also, pilot plant tests are provided in Examples 8-12 showing how various process parameters affect the efficacy of the selenium removal process. For example, Examples 10-11 demonstrate, among other things, the need for a threshold concentration of the oxidizing agent in the waste water stream, while Examples 8-9 demonstrate the additional increase in selenium removal obtainable by further raising the oxidizing agent concentration in the waste water stream.

EXAMPLE 1

UNIPURE Waste Water Treatment Procedure - Establishing A Baseline

A sample (about 600 ml) of phenolic sour water was placed into a reaction vessel. (In the present and following examples, the COD of the phenolic sour water varied roughly from 4,000 to 7,000 mg oxygen/l.) Ferrous chloride (about 100 mg/l as $Fe^{+2}$) was introduced into the reaction vessel at the start of the reaction (time 0 min). Air was sparged into the reaction vessel during the course of the UNIPURE waste water treatment procedure at a rate of about 0.7 l/min. During the UNIPURE treatment procedure the pH of the treated sample ranged from about 7.6 to about 7.9. The initial selenium content of the phenolic sour water (i.e., at time 0 min) was about 4.98 mg/l and, at the end of the UNIPURE waste water treatment procedure (i.e., after being subjected to the UNIPURE procedure for about 30 minutes), the final selenium content was about 4.52 mg/l - giving a selenium removal of only about 17 weight percent. These reaction conditions and results are summarized below in Table II.

TABLE II

| Parameter | Example 1 | 2 | 3 | 4 | 5 | 6 | 7 |
|---|---|---|---|---|---|---|---|
| Sample volume, ml | 600 | 600 | 600 | 1500 | 600 | 200 | 200 |
| pH | 7.6–7.9 | 7.5–8.2 | 7.5–8.2 | 7.5–8.2 | 7.5–8.2 | 7.5–8.5 | 7.5–8.5 |
| $FeCl_2$, mg/l as $Fe^{+2}$ | 100 | 100 | 100 | 100 | 200 | 100 | 100 |
| Air flow, l/min | 0.7 | 0.7 | 0.7 | 0.7 | 0.7 | 0.4 | 0.4 |
| Oxidizing agent, mg/l | | | | | | | |
| Hydrogen peroxide | — | 200 | — | — | — | — | — |
| Sodium hypochlorite | — | — | 200 | 1500 | 1650 | — | — |
| Sodium chlorate | — | — | — | — | — | 410 | — |
| Sodium chlorite | — | — | — | — | — | — | 680 |
| Selenium, mg/l | | | | | | | |
| Initial | 4.98 | 4.04 | 4.02 | 4.05 | 3.54 | 5.92 | 5.92 |
| Final | 4.52 | 3.40 | 1.14 | 0.58 | 0.29 | 1.16 | 0.70 |
| Selenium removal, % | 17 | 16 | 72 | 86 | 92 | 80 | 88 |

EXAMPLE 2

Comparative Test - Outside Scope Of Invention

The UNIPURE treatment procedure of Example 1 was repeated using substantially the same reaction conditions as shown in above Table II. In addition, before subjecting the phenolic sour water to the UNIPURE treatment procedure, the phenolic sour water was pretreated using about 200 mg/l of hydrogen peroxide as an oxidizing agent. In the pretreatment procedure, the hydrogen peroxide was added all at once and allowed to react with the phenolic sour water for about 5 minutes. After this 5 minute pretreatment procedure, the pretreated water was subjected to substantially the same UNIPURE treatment procedure as described in Example 1. Despite the fact that hydrogen peroxide has a redox potential of about 0.87 in neutral to basic solutions—a redox potential substantially identical with the 0.90 redox potential of sodium hypochlorite employed in the pretreatment steps of the following comparative Examples 3-5, hydrogen peroxide did not increase the ability of the subsequent UNIPURE water treatment procedure to remove selenium. In particular, after being subjected to the UNIPURE treatment procedure for about 30 minutes, the UNIPURE treated waste water still contained about 3.40 mg/l selenium. Accordingly, only about 16 percent of the initial selenium content of the waste water was removed when hydrogen peroxide was employed to pretreat the phenolic sour water. (Although this comparative Example 2 is labeled as being "Outside Scope Of Invention," this labeling does not mean that Example 2 falls within the prior art.)

EXAMPLES 3-7

Comparative Tests - Within Scope Of Invention

The UNIPURE waste water treatment procedure, as performed in Examples 1 and 2, and the pretreatment step conducted in Example 2 were also repeated in Example 3 using substantially the same reaction conditions as indicated in Table II, supra, with one major modification. In Example 3, about 200 mg/l of sodium hypochlorite, an exemplary oxidizing agent used in the pretreatment process of the present invention, was employed in place of hydrogen peroxide to pretreat the phenolic sour water according to the procedure discussed in preceding Example 2. As a result of the sodium hypochlorite pretreatment step, the subsequent UNIPURE waste water treatment procedure removed about 72 percent of the selenium initially present in the phenolic sour waste water.

The comparative test performed in Example 4 differed from that performed in Example 3 in one material respect, namely, a higher concentration (about 1,500 mg/l) of sodium hypochlorite was used in the pretreatment step. This change elicited a further improvement in the ability of the subsequent UNIPURE waste treatment procedure to remove selenium. In particular, about 86 percent of the selenium initially present in the phenolic sour waste water was removed by the UNIPURE waste treatment procedure after the phenolic sour water was pretreated using about 1,500 mg/l of sodium hypochlorite.

Regarding the comparative test conducted in Example 5, although this test used the same volume of phenolic sour waste water as employed in Example 3, it nevertheless differed from the procedure of Example 3 in two aspects. In particular, the sodium hypochlorite concentration employed in the pretreatment step was again higher (about 1,650 mg/l) and, this time, a higher concentration of $FeCl_2$ (about 200 mg/ml as $Fe^{+2}$) was used in the UNIPURE waste treatment procedure. As a result of these modifications, the UNIPURE waste treatment procedure of Example 5 removed even more selenium-achieving a selenium removal of about 92 percent.

In Example 6, the oxidizing agent employed in the pretreatment step was sodium chlorate - another exemplary oxidizing agent employed in the pretreatment process of the present invention. The only other significant modification was the reduction in air flow rate to about 0.4 ml/min in the UNIPURE procedure. Despite the reduction in air flow rate, sodium chlorate enabled the UNIPURE waste treatment procedure to remove about 80 percent of the selenium content present in the waste water.

The pretreatment step and the UNIPURE procedure employed in Example 7 were very similar to those of Example 6 with the sole material difference being the use of sodium chlorite (an exemplary oxidizing agent employed in the pretreatment process of the present invention) as the oxidizing agent in the pretreatment step. Excellent results were again obtained with the following UNIPURE waste treatment procedure removing about 88 percent of the initial selenium content of the waste water.

Accordingly, the above comparative tests of Examples 3-7, and especially that of Example 3, demonstrate that exemplary pretreatment processes within the scope of the present invention remarkably increase the ability of a waste water treatment process to remove selenium. Furthermore, these results are very unexpected in view of Example 2. More particularly, Example 2 shows the inability of a hydrogen peroxide pretreatment to beneficially affect the selenium removal ability of a subsequent waste water treatment process. The substantial inability of hydrogen peroxide to enhance the removal of selenium from waste water is especially striking in view of the fact that the redox potential of hydrogen peroxide (0.90) is almost identical to the redox potential of sodium hypochlorite (0.90), an exemplary oxidizing agent employed in the pretreatment process of the present invention.

EXAMPLES 8-9

Pilot Plant Runs

In the pilot plant runs of Examples 8-9, phenolic sour water having an initial selenium concentration of about 5.25 mg/l was subjected to a preliminary air oxidation step. In this preliminary oxidation step, the phenolic sour water having a temperature of about 120° F. (about 49° C.) was passed at a rate of about 110 gpm through an air oxidation vessel in which air was also being introduced at a rate of approximately 90 standard cubic feet per minute (SCFM). The residence time of the waste water in the air oxidation vessel was roughly 3 hours. Easily oxidized compounds were decomposed by the oxygen in the introduced air.

After being subjected to the preliminary air oxidation step, the waste water was next pretreated with sodium hypochlorite. In particular, sodium hypochlorite was injected at a rate of about 437 mg/l into a stream of waste water flowing at a rate of about 25 gpm.

The sodium hypochlorite pretreatment phenolic sour water was then subjected to a UNIPURE brand waste water treatment process. In particular, the pretreated waste water was introduced into an approximately 1,000 gallon capacity reaction vessel. $FeCl_2$ was added to the reaction vessel at a sufficient rate to maintain the concentration of $Fe^{+2}$ in the vessel at about 100 mg/l, air was sparged into the reaction vessel at a rate of about 10 SCFM, and the contents of the reaction vessel were stirred using a stirrer rotating at a rate of about 60 rpm. The waste water residence time in the reaction vessel was about 40 minutes.

The treated effluent from the reaction vessel had a selenium concentration of about 1.85 mg/l. Accordingly, a reduction in selenium concentration of about 65 percent was achieved. The above operating parameters and results are set forth in the following Table III:

TABLE III

Pilot Plant Results

| Parameter | Example 8 | Example 9 | Example 10 | Example 11 |
|---|---|---|---|---|
| Initial Air Oxidation | Yes | Yes | No | No |
| Water flow rate, gpm | 25 | 25 | 25 | 25 |
| NaClO, mg/l | 437 | 900 | 420 | 745 |
| $FeCl_2$, mg/l as $Fe^{+2}$ | 100 | 100 | 100 | 100 |
| pH | 7.5-8.2 | 7.5-8.2 | 7.5-8.2 | 7.5-8.2 |
| Air flow, SCFM | 10 | 10 | 10 | 10 |
| Residence time, min | 40 | 40 | 40 | 40 |
| Selenium, mg/l | | | | |
| Initial | 5.25 | 4.20 | 3.06 | 4.36 |
| Final | 1.85 | 1.14 | 3.02 | 1.05 |
| Selenium removal, % | 65 | 73 | 1 | 76 |

In Example 9, the pilot plant run of Example 8 was repeated with one major modification—the sodium hypochlorite concentration was a little more than doubled. The net effect of this increase in sodium hypochlorite was an additional (about 8 percent) increase in selenium removal, giving a total selenium removal of about 73 percent.

The air oxidation step was not utilized in the pilot plant runs of Examples 10-11. Accordingly, although comparable concentrations of sodium hypochlorite were employed in Examples 8 and 10 and although Example 10 had a lower initial selenium concentration than Example 8, practically no selenium was removed by the pilot plant run of Example 10. The reason for this result is that the highly reactive compounds were oxidized in the preliminary air oxidation step of Example 8 and, therefore, did not compete for the sodium hypochlorite added during the pretreatment step. In contrast, since a preliminary oxidation step was not employed in Example 10, these highly reactive compounds reacted with the sodium hypochlorite in the pretreatment step before the sodium hypochlorite had a chance to react with, and raise the valence state of, $Se^{-2}$, $Se^0$, and/or $Se^{+2}$. Therefore, in those instances where an initial oxidation step is not employed to remove the more reactive compounds, a higher concentration of the oxidizing agent is required. This conclusion is supported by Example 11.

As shown in the above Table III, the parameters employed in Example 11 are substantially identical to those employed in Example 10 with the major difference being that the sodium hypochlorite concentration was raised from about 420 mg/l to about 745 mg/l. This increase in sodium hypochlorite concentration raised the selenium removal ability of the waste treatment process from about 1 percent (Example 10) to about 76 percent (Example 11). Accordingly, Examples 10-11 demonstrate that a threshold concentration of the oxidizing agent is required in order to increase the selenium removal efficiency of the subsequent waste removal process. Once this threshold level is crossed, Example 8-9 demonstrate that an additional increase in the concentration of the oxidizing agent can further increase the level of selenium removal, but not in such a dramatic fashion.

EXAMPLE 12

Additional Pilot Plant Run

In the pilot plant run of Example 12, a phenolic sour water stream was first treated with a preliminary air oxidation step as discussed in preceding Examples 8-9 and then combined with a nonphenolic sour water stream in a volumetric ratio of about 1:1. The nonphenolic sour water had a COD of about 40 mg oxygen/l and the stream of combined phenolic and nonphenolic sour waters had a COD of about 2,540 mg oxygen/l. The selenium concentration in the combined stream was about 3.37 mg/l.

The combined stream of phenolic and nonphenolic waste water was pretreated with sodium hypochlorite, the sodium hypochlorite being added at a rate sufficient to maintain its concentration in the combined stream at about 450 mg/l. After the sodium hypochlorite pretreatment step, the combined stream was subjected to the UNIPURE process using substantially the same reaction parameters as in Examples 8-11, namely, a water flow rate of about 25 gpm, a $FeCl_2$ addition rate sufficient to maintain a $Fe^{+2}$ concentration of about 100 mg/l, an operating pH of about 7.5-8.2, and an air flow rate of about 10 SCFM. The effluent from the UNIPURE process had a selenium concentration of about 0.54, yielding an selenium removal of about 84 percent.

Although the present invention has been described in considerable detail with reference to some preferred versions, other versions are possible. For example, the waste streams, in addition to or as an alternative to being subjected to a preliminary air oxidation step, can be subjected to other preparatory procedures. Likewise, the effluents from the waste treatment plant can be subjected to supplemental remedial procedures. Furthermore, chemicals useful in performing a waste removal procedure (such as calcium chloride used in waste treatment processes as a foam controlling agent) can be added to a waste water upstream from the location where the pretreatment process of the present invention is conducted. In addition, waste water treated with the pretreatment process of the present invention can be combined with another waste water stream or other medium, and the resulting combination can then be subjected to a waste water treatment process. Therefore, the spirit and scope of the appended claims should not necessarily be limited to the description of the preferred versions contained herein.

What is claimed is:
1. A process comprising the steps of:
    (a) contacting a compound selected from the group having the formula

$X(ZO_a)_b$, $Q_mO_n$, $ClO_3$, $Cl_2O_6$, $Br_3O_8$, $I_2O_5$, and mixtures thereof with a selenium-containing waste water having (i) a chemical oxygen demand of at least about 25 mg oxygen/l and (ii) at least a portion of the selenium content present in a valence state of less than +4 to form a $Se^{+4}$-containing pretreated waste water; and
    (b) removing at least about 50 percent of the selenium content from the $Se^{+4}$-containing pretreated waste water,
wherein
    X is a cation;
    Z is halogen selected from the group consisting of chlorine, bromine, and iodine;
    a is an integer from 1-3;
    b is an integer equal to the valence of X;
    Q is chlorine or bromine; and
    m and n are each 1 or 2, provided than m+n equals 3.

2. The process of claim 1 wherein the compound has the formula $X(ZO_a)_b$ and X is selected from the group consisting of alkali metals and alkaline-earth metals; and Z is a halogen selected from the group consisting of chlorine and bromine.

3. The process of claim 2 wherein X is selected from the group consisting of sodium, potassium, calcium, and magnesium.

4. The process of claim 1 wherein the compound has the formula $NaClO_a$.

5. The process of claim 1 wherein the compound has the formula $NaClO$.

6. The process of claim 1 wherein the selenium-containing waste water has a pH of at least about 6.

7. The process of claim 1 wherein the selenium-containing waste water has a pH of at least about 7.

8. The process of claim 1 wherein the selenium-containing waste water has a pH of about 7.5 to about 8.5.

9. The process of claim 1 wherein the selenium-containing waste water is contacted with a sufficient amount of the compound for the $Se^{+4}$-containing pretreated waste water to have a $Se^{+4}$ concentration at least about 50 percent greater than the $Se^{+4}$ concentration in the selenium-containing waste water.

10. The process of claim 1 wherein the selenium-containing waste water is contacted with a sufficient amount of the compound for the $Se^{+4}$-containing pretreated waste water to have a $Se^{+4}$ concentration at least about 75 percent greater than the $Se^{+4}$ concentration in the selenium-containing waste water.

11. The process of claim 1 wherein the selenium-containing waste water is contacted with a sufficient amount of the compound for the $Se^{+4}$-containing pretreated waste water to have a $Se^{+4}$ concentration at least about 85 percent greater than the $Se^{+4}$ concentration in the selenium-containing waste water.

12. The process of claim 1 wherein the selenium-containing waste water further comprises at least one non-selenium containing substance capable of being oxidized by the compound.

13. The process of claim 1 wherein step (b) comprises removing at least about 75 percent of the selenium content from the $Se^{+4}$-containing pretreated waste water.

14. The process of claim 1 wherein step (b) comprises removing at least about 85 percent of the selenium content from the $Se^{+4}$-containing pretreated waste water.

15. The process of claim 1 wherein step (b) comprises removing at least about 90 percent of the selenium content from the $Se^{+4}$-containing pretreated waste water.

16. The process of claim 1 wherein the selenium-containing waste water is contacted with a sufficient amount of the compound for the $Se^{+4}$-containing pretreated waste water to have a $Se^{+4}$ concentration at least about 90 percent greater than the $Se^{+4}$ concentration in the selenium-containing waste water.

17. A process comprising the steps of:
(a) introducing oxygen into a selenium-containing waste water having (i) a chemical oxygen demand of at least about 25 mg oxygen/l and (ii) at least a portion of the selenium content present in a valence state of less than +4 to form an oxidized selenium-containing waste water having at least a portion of the selenium content still present in a valence state of less than +4;
(b) combining the oxidized selenium-containing waste water with another waste water to form a combined selenium-containing waste water having at least a portion of the selenium content present in a valence state of less than +4;
(c) contacting a compound selected from the group having the formula $X(ZO_a)_b$, $Q_mO_n$, $ClO_3$, $Cl_2O_6$, $Br_3O_8$, $I_2O_5$, and mixtures thereof with the combined selenium-containing waste water to form a $Se^{+4}$-containing pretreated waste water; and
(d) removing at least about 50 weight percent of the selenium content from the $Se^{+4}$-containing pretreated waste water.

18. The process of claim 17 wherein step (d) comprises removing at least about 75 percent of the selenium content from the $Se^{+4}$-containing pretreated waste water.

19. The process of claim 17 wherein step (d) comprises removing at least about 85 percent of the selenium content from the $Se^{+4}$-containing pretreated waste water.

20. The process of claim 17 wherein step (d) comprises removing at least about 90 percent of the selenium content from the $Se^{+4}$-containing pretreated waste water.

* * * * *

UNITED STATES PATENT AND TRADEMARK OFFICE
CERTIFICATE OF CORRECTION

PATENT NO. : 5,071,568

DATED : December 10, 1991

INVENTOR(S) : Charles R. Bennett and John Gerlach

It is certified that error appears in the above-identified patent and that said Letters Patent is hereby corrected as shown below:

Title Page:
Abstract, line 15:
   Before "$I_2O_5$ and" delete "Ti".

Signed and Sealed this

Fourth Day of May, 1993

Attest:

MICHAEL K. KIRK

Attesting Officer

Acting Commissioner of Patents and Trademarks